UNITED STATES PATENT OFFICE 2,600,289

PRODUCTION OF PYRROLES

Charles A. Bordner, Niagara Falls, N. Y., assignor to E. I. du Pont de Nemours & Company, Wilmington, Del., a corporation of Delaware No Drawing. Application March 19, 1948, Serial No. 15,955

10 Claims. (Cl. 260—313)

This invention relates to the production of pyrrole, alkyl substituted pyrroles and corresponding hydrogenated compounds.

Pyrrole has been produced by the vapor phase reaction at elevated temperatures of furan with ammonia in the presence of alumina (Yur'ev, Ber. 69, 440 (1936)) and N-methyl pyrrole has been produced similarly by the reaction of furan with methyl amine (Yur'ev, J. Gen. Chem. (U. S. S. R.) 8, 1936 (1938)). Generally, substantially anhydrous reactants have been employed. Such methods result in low conversions to and low yields of the pyrrole compound and the effective life of the catalyst is extremely short. Thus, Wilson (J. C. S. 1945, 63) in checking the method of Yur'ev for producing pyrrole found it necessary to reactivate the catalyst after each gram mole of furan used and by so doing the conversion to pyrrole was 20% and the yield 32%. The present invention relates to an improvement of the above methods.

It is an object of the invention to provide an improved method for preparing pyrrole, substituted pyrroles and corresponding tetrahydrogenated compounds. A further object is to provide a method whereby furan, substituted furans and the corresponding tetrahydro furans may be reacted in the vapor phase with ammonia or primary amines in the presence of an alumina catalyst to obtain pyrrole, substituted pyrroles or the corresponding tetrahydro compounds in improved conversions and yields and with good catalyst life. Still other objects will be apparent from the following description.

The above objects are accomplished in accordance with the invention by reacting furan, an alkyl substituted furan or a corresponding tetrahydro furan in the vapor phase at elevated temperature with ammonia or a primary amine in the presence of an alumina dehydration catalyst and in the presence of added steam. I have discovered that the presence of added steam has a decidedly beneficial effect in improving conversions and yields and in increasing catalyst life.

The amount of steam added must be substantial, i. e., at least one mole per mole of furan, substituted furan or tetrahydro furan compound in order for there to be any worthwhile improvement in results. Generally, it will be desirable to employ at least 3 moles and preferably from 6 to 20 moles of added steam. Under the preferred conditions excellent conversions and yields are possible, by-product formation is greatly reduced and the catalyst life is increased many times when furan compounds are reacted. Still larger amounts of steam may be used but amounts greater than about 25 moles per mole of furan or like compound are not recommended for economic reasons.

The invention is further illustrated by the following examples in which all molar amounts stated refer to gram moles.

Example 1

The reactor consisted of an upright electrically heated 1.5 in. diameter iron pipe 60 in. long provided with an inner thermocouple well extending the length of the tube. About 913 cc. of 8–14 mesh gamma alumina gel catalyst was placed into the lower section and on top of the catalyst there was a 15 in. section of porcelain chips which served as a vaporizer and preheater. The catalyst, which had been used in a previous run, was reactivated for use in this run by passing a stream of air through it at about 550–600° C. until all hot spots disappeared. Tubes were provided for feeding reactants into the top, and the bottom of the reactor was connected to a recovery system consisting of an ice-cooled receiver connected through a water-cooled reflux condenser to two traps cooled by a trichloroethylene-solid carbon dioxide cooling bath. The last trap was vented to the atmosphere.

In starting the run, a stream of ammonia and steam was passed through the reactor until desired temperature conditions were reached. Then the required amount of furan was fed along with the other materials. At the end of the run, ammonia and steam were allowed to flow for a time after the furan had been shut off in order to sweep out organic materials as much as possible from the catalyst before shutting down. During the 214 minutes when furan was being fed, totals of 4.2 moles furan and 14.2 moles ammonia in 71.8 moles water were fed separately and at uniform rates. The catalyst and preheater sections of the reactor were maintained at a temperature of 380–410° C. The mole ratios of furan : $NH_3$ : $H_2O$ were 1.0 : 3.4 : 17.1.

Product collected in the ice-cooled receiver consisted of water, ammonia, furan, pyrrole and unidentified high boiling products. Material collected in the two traps consisted only of furan and ammonia. There were recovered from the reaction products by distillation methods 2.35 moles pyrrole and 0.36 mole unused furan. The conversion to and yield of pyrrole were 56.0% and 61.2%, respectively.

Example 2

Example 1 was repeated at 485–500° C. and at feed ratios of furan : NH₃ : H₂O of 1.0 : 1.8 : 9.3. The moles of furan, NH₃ and H₂O fed during 84 minutes were 5.22, 9.6 and 48.5, respectively. There were recovered 0.5 mole furan and 3.23 moles pyrrole, corresponding to a conversion to and yield of pyrrole of 61.9% and 68.6%, respectively.

Example 3

Example 2 was repeated using the same catalyst without reactivation at 480–490° C. The duration of the run was 98 minutes and the moles of furan, ammonia and water fed were 5.88, 10.6 and 53.6, respectively. The recoveries of furan and pyrrole were 1.28 moles and 3.70 moles, respectively. The conversion to and yield of pyrrole were 63.0% and 80.5%, respectively.

The results of Examples 2 and 3 show that yields are substantially higher when employing catalyst which has been used in a preceding run, without reactivating it, although there is no substantial difference in the conversions obtained. Other similar pairs of runs at temperatures ranging from 420° C. up to about 500° C. showed the same phenomenon, i. e., that while the conversions in the two runs of each pair remained about the same, the yield in the second run of each pair in which the catalyst was reused without reactivation, was about 6–12% higher. It was observed that the amount of furan recovered in the last of each pair of runs was substantially greater than in the first run, indicating that freshly reactivated catalyst (used in each of the first runs) causes more condensation or polymerization to occur than does used catalyst.

Example 4

Example 2 was repeated using nitrogen in place of steam at 485–500° C. The moles of furan, ammonia and nitrogen fed in 95 minutes were 5.88, 11.2 and 50.1, respectively, the mole ratios being 1.0 : 1.9 : 8.5. The conversion to and yield of pyrrole were 16.8% and 22.0%, respectively, based on furan. At the end of the run, the catalyst was found to be badly contaminated with by-product materials. In reactivating it in the manner indicated in Example 1, the air had to be admitted very slowly otherwise the temperature rose rapidly to a detrimentally high point.

The results of Examples 2 and 4 show that the beneficial action of steam is not due solely to its diluent effect. Apparently, the steam functions primarily to prevent or greatly inhibit the formation of polymerization or condensation products which tend to deposit on and foul the catalyst. Such inhibition of catalyst fouling is not realized to any substantial extent when using nitrogen in place of steam.

Example 5

Example 1 was repeated at a temperature of 365–390° C. using 5.88 moles furan, 14.86 moles methyl amine (instead of ammonia) and 84.2 moles water during 4 hours 16 minutes. The mole ratios of furan : $CH_3NH_2$ : $H_2O$ were 1.0 : 2.5 : 14.3. The catalyst had been freshly reactivated by means of air at about 550–600° C. Reaction products included 3.58 moles furan and 1.10 moles N-methyl pyrrole. The conversion was 18.7% and the yield 47.8%. The run was repeated at 375–400° C. for another 4 hours 10 minutes without reactivating the catalyst, during which time 5.88, 15.65 and 75.6 moles furan, methyl amine and water, respectively, were fed. The mole ratios were 1.0 : 2.7 : 12.9. The reaction products included 3.64 moles furan and 1.20 moles N-methyl pyrrole, corresponding to a conversion and yield of 20.4% and 53.6%, respectively.

Example 6

This run was similar to that of Example 5 except that a smaller reactor containing 400 cc. of catalyst was used, the temperature was 420–440° C. and no steam was added. There were fed during 4 hours 40 minutes, 6.26 moles furan and 17.16 moles methylamine, the mole ratio being 1.0 : 2.7. There were recovered 3.88 moles furan and 0.39 mole N-methyl pyrrole, corresponding to a conversion and yield of 6.2% and 16.4%, respectively. In a repeat run at 370–405° C. in which steam was added and 913 cc. of catalyst was employed, there were passed 5.88, 1.29 and 73.5 moles of furan, methyl amine and water, respectively, during 3 hours 38 minutes. The mole ratios of furan : methyl amine : $H_2O$ were $$1.0 : 2.2 : 11.0$$

There were recovered 1.47 moles furan and 2.13 moles N-methyl pyrrole, corresponding to a conversion and yield of 36.2% and 48.3%, respectively.

Example 7

This run was similar to the first run of Example 5 in that freshly reactivated catalyst was used, but differed therefrom in employing an excess of furan. The mole ratios of $$\text{furan} : CH_3NH_2 : H_2O \text{ were } 2.9 : 1.0 : 10.3$$

The temperature was 380–405° C., the time 2 hours 12 minutes; and, 12.6, 4.30 and 44.1 moles furan, methyl amine and water were fed. The N-methyl pyrrole obtained corresponded to conversions of 17.3% and 48.0% and yields of 56.2% and 48.0%, respectively, based on furan and methyl amine. The yield based on the amine assumed complete consumption of all of the amine fed since no recovery of unused amine was attempted..

Example 8

This example was similar to the first run of Example 5, except that ammonia and methanol were used in place of methyl amine. The mole ratios of furan : $NH_3$ : $CH_3OH$ : $H_2O$ were $$1.0 : 2.5 : 3.0 : 9.8$$

and the moles fed were 6.36, 15.6, 19.1 and 62.4, respectively. The temperature was 400–440° C. and the time 4 hours 8 minutes. The N-methyl pyrrole produced corresponding to a conversion of 11.9% and a yield of 23.5%, based on furan.

Example 9

Example 1 was repeated at 345–355° C. using tetrahydro furan (in place of furan), ammonia and water in mole ratios of about 1.0 : 2.1 : 7.4. The moles of the above materials fed in 297 minutes were 12.5, 25.8 and 92.4, respectively. The 5.51 moles tetrahydro furan and 4.29 moles pyrrolidine recovered corresponded to a conversion of 34.3% and a yield of 61.4%.

Example 10

Using reactivated gamma alumina gel at 365–400° C. a 28.1% conversion to and a 43.7% yield of 2-methyl pyrrole were obtained when 4.46 moles 2-methyl furan, 21.0 moles ammonia and 50.8 moles water were fed to the reactor of Example 1 during 92 minutes. The mole feed ratios of 2-methyl furan : $NH_3$ : $H_2O$ were 1.0 : 4.7 : 11.4.

A large excess of either the furan (or tetrahydro furan) compound or ammonia (or primary amine) may be used. When ammonia is used, an excess thereof is preferred for economic reasons. When reacting a primary amine, it may be more economical to employ an excess of, for example, furan. An excess of more than about 300% of either type of reactant is generally not recommended, although the amount of the excess is not critical and will be governed chiefly by the economics involved in each case.

One of the chief advantages resulting from the presence of added steam is the improvement in conversion and yield. Such improvement is generally greatest when a furan type compound is being reacted, although substantial improvement also results in the case of the corresponding tetrahydro compounds. With the furan type reactants, a further important advantage is the improvement in catalyst life resulting from the use of steam. No significant advantage in this respect is realized in the case of the tetrahydro reactants since with such compounds catalyst life is good even in the absence of added steam. Accordingly, the present invention may be practiced advantageously with either type of reactant but maximum improvements over prior methods are obtainable when furan type compounds are used.

The maximum effect of added steam on catalyst life in the preparation of, for example, pyrrole and N-methyl pyrrole, has not been established but continuous use of a catalyst over an 18 hour period with no substantial decrease in catalyst activity has been demonstrated. Rates of production on the order of 170 g. pyrrole and 90 g. N-methyl pyrrole per hour per liter of catalyst have been realized. In general, contact times within the range 0.5 to 10 seconds are satisfactory although indications are that contact times over a considerably wider range may be employed successfully.

Pressure is not critical and sub- or superatmospheric pressures may be used if desired. Operation at about atmospheric pressure is preferred.

In general temperatures of about 250–600° C. are operable, although the operable and preferred temperature ranges vary somewhat depending on the specific reactants used. Thus, with the furan type reactants, a more satisfactory temperature range is 300–600° C., the preferred range being 350–500° C.; whereas with the tetrahydro furan type reactants, a range of 250–500° C., and preferably 300–400° C., is recommended. With the former, reaction is slight below 300° C. whereas with the latter compounds decomposition reactions tend to become excessive above about 500° C.

Alumina dehydration type catalysts in general may be used but best results are obtained employing the gamma type aluminas since they are considerably more active as catalysts for the present reactions.

The above examples have illustrated specifically the use of furan, 2-methyl furan and tetrahydro furan as reactants. In place thereof, derivatives of furan or tetrahydro furan in which one or more hydrogen atoms have been replaced by alkyl radicals may be used. Specific suitable compounds not shown in the examples are 2-ethyl furan, 2,5-dimethyl furan, 2-methyl-5-ethyl furan, 3-methyl furan, 2-methyl tetrahydro furan, 2-ethyl tetrahydro furan, 2,5-dimethyl tetrahydro furan, 2-methyl-5-ethyl tetrahydrofuran and 2-propyl tetrahydro furan. The unsubstituted compounds, particularly furan, are preferred. Of the alkyl substituted compounds, those in which each substituent group contains not more than 2 carbon atoms and especially those compounds which contain a total of not more than 6 carbon atoms are preferred.

When ammonia is a reactant, there are obtained pyrrole or pyrrolidine compounds containing a hydrogen atom on the ring nitrogen atom, whereas when a primary amine is used the products are primarily N-substituted pyrroles or pyrrolidines. Suitable primary amine reactants are the primary alkyl amines in which the $NH_2$— group may be attached to either a primary, secondary or tertiary carbon atom. Illustrative of these are methylamine, ethylamine, the propylamines, the butylamines, etc. Aryl, aralkyl and alicyclic amines such as aniline, benzylamine and cyclohexylamine may also be used. The lower primary alkyl amines, i. e. those containing not more than 5 carbon atoms, and particularly the lower normal primary amines are preferred.

It is generally desirable to avoid mixing the reactants, especially in the liquid phase, before they enter the reactor. This is particularly true when furan or a substitued furan is used, since such compounds tend to polymerize in the presence of ammonia or amines.

The products obtained by the present method are useful as chemical intermediates in the production of dyes, antiseptics and perfumes.

I claim:

1. The method of producing a compound of the group consisting of pyrroles and substituted pyrroles, comprising reacting a heterocyclic compound of the group consisting of furan and alkyl substituted furans in the vapor phase with a compound of the group consisting of ammonia and primary amines at an elevated temperature in the presence of an alumina dehydration catalyst and of at least one mole of added steam per mole of said heterocyclic compound.

2. The method of claim 1 wherein a gamma alumina catalyst is used.

3. The method of claim 2 wherein the reaction is carried out at a temperature of 300 to 600° C.

4. The method of producing pyrrole comprising reacting furan in the vapor phase with ammonia at 300–600° C. in the presence of an alumina dehydration catalyst and of at least 1 mole of added steam per mole of furan.

5. The method of claim 4 wherein a gamma alumina catalyst is used.

6. The method of claim 5, wherein the temperature is 350–500° C. and 6–20 moles of steam are present per mole of furan.

7. The method of producing an N-alkyl pyrrole comprising reacting furan in the vapor phase with a lower primary alkyl amine at a temperature of 300–600° C. in the presence of an alumina dehydration catalyst and of at least 1 mole of added steam per mole of furan.

8. The method of claim 7 wherein a gamma alumina catalyst is used.

9. The method of claim 8 wherein the temperature is 350–500° C. and 6–20 moles of added steam are present per mole of furan.

10. The method of claim 9, wherein the amine reacted is methylamine.

CHARLES A. BORDNER.

(References on following page)

REFERENCES CITED

The following references are of record in the file of this patent:

UNITED STATES PATENTS

| Number | Name | Date |
|---|---|---|
| 2,415,061 | De Sino et al. | Jan. 28, 1947 |
| 2,525,584 | Bordner et al. | Oct. 10, 1950 |

FOREIGN PATENTS

| Number | Country | Date |
|---|---|---|
| 554,889 | Great Britain | July 23, 1943 |
| 563,636 | Great Britain | Aug. 23, 1944 |

OTHER REFERENCES

Wilson: Jour. Chem. Soc. (London), (1945), pp. 63 and 64.

Chem. Abst., vol. 32, p. 5399 (1938), citing: J. Gen. Chem. (USSR) 7: 2945-2949 (1937) and 8: 116-119.

Jellinek et al.: Ind. and Engl. Chem., vol. 37 (February 1945), pp. 158-163.

Alekseevski: Chem. Abstr., vol. 24 (1930), p. 4442.

Yur'ev et al.: Jour. Gen. Chem. (USSR), vol. 9 (1939), pp. 590-594 (abstracted Chem. Abstr., vol. 33 (1939), p. 7779).

Braun et al.: Chem. Abstr., vol. 31 (1937), pp. 4961-4963.

Feachem et al.: Jour. Chem. Soc. (London), 1948, pp. 267-272.

Bentley et al.: Jour. Chem. Soc. Ind. (trans.), vol. 64 (1945), pp. 148 and 149.

Wilson: Jour. Chem. Soc. (London), 1945, pp. 63-64.

Sabatier: Catalysis in Organic Chemistry, Van Nostrand, N. Y., 1923, p. 232 (para. 651).

Jurjew: Ber. der Deut. Chem., vol. 69 (1936), pp. 1002-1004.

Yur'ev et al.: Jour. Gen. Chem. (USSR), vol. 7 (1937), pp. 1868-1873 (abstracted Chem. Abst., vol. 32 (1938), p. 548.